United States Patent [19]
Van Leeuwen

[11] 3,740,887
[45] June 26, 1973

[54] NIBBLE DETECTING LIGHT FOR FISHING POLES

[76] Inventor: Marion Van Leeuwen, 531 High St. Apt. 5, New London, Wis. 54961

[22] Filed: Nov. 29, 1971

[21] Appl. No.: 202,794

[52] U.S. Cl. ................... 43/17.5, 43/17, 240/6.4 F
[51] Int. Cl. ...................... A01k 97/12, F21v 33/00
[58] Field of Search ............................... 43/17.5, 17; 240/6.4, 6.42, 6.46

[56] References Cited
UNITED STATES PATENTS

| | | | |
|---|---|---|---|
| 3,017,499 | 1/1962 | Fore | 240/6.4 |
| 2,104,340 | 1/1938 | Carmody | 240/6.42 |
| 2,136,199 | 11/1938 | Swanson | 240/6.46 |

*Primary Examiner*—Louis G. Mancene
*Assistant Examiner*—Daniel J. Leach
*Attorney*—Luke A. Mattare et al.

[57] ABSTRACT

An economical, lightweight self-contained lighting unit attachable to the tip of a fishing pole to indicate a position or movement of the fishing pole under conditions of low visibility so that a person using the fishing pole is enabled to readily observe a nibble or strike by a fish or any other pull on the fishing line which affects the tip of the pole.

16 Claims, 6 Drawing Figures

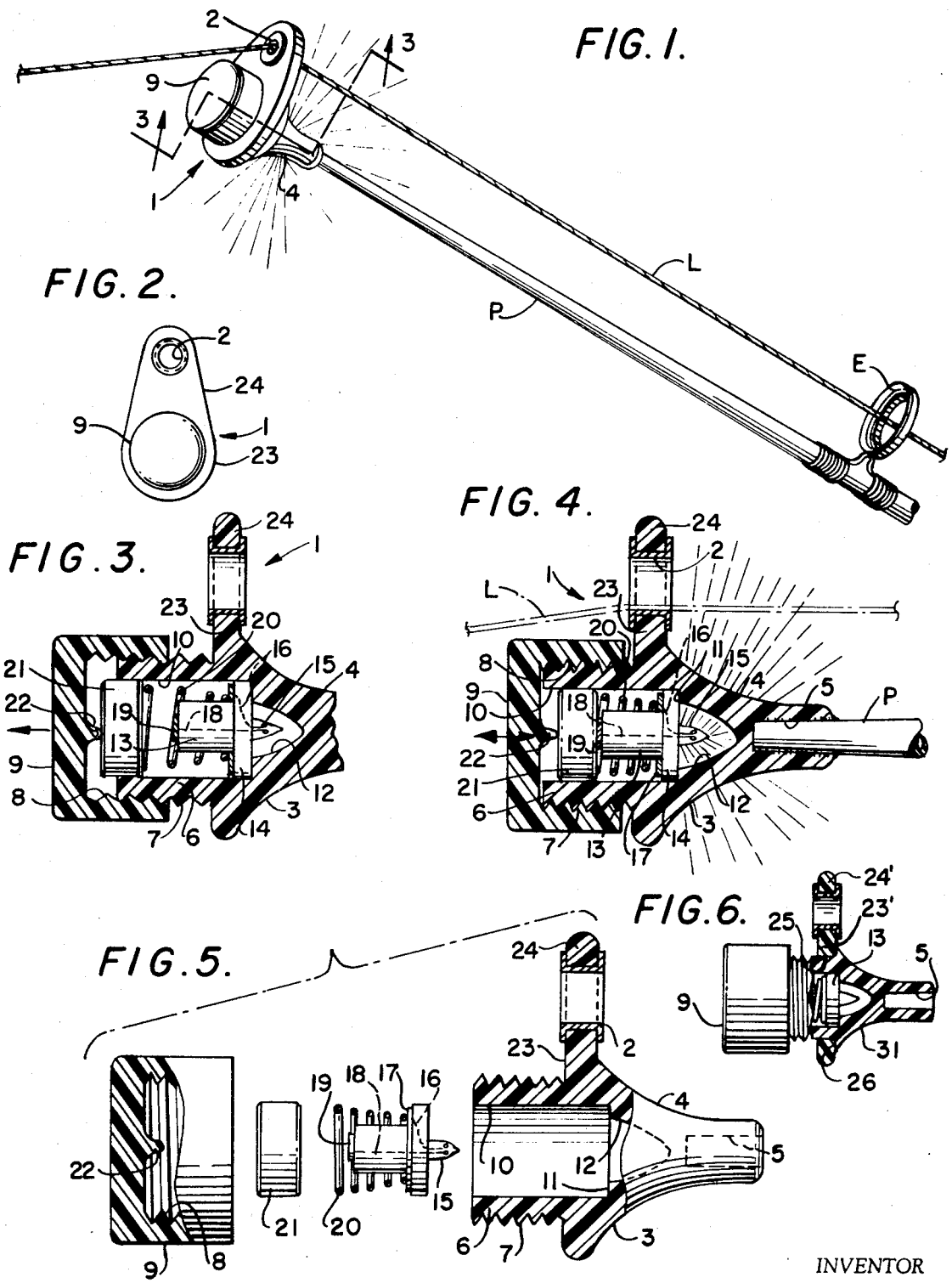

NIBBLE DETECTING LIGHT FOR FISHING POLES

BACKGROUND OF THE INVENTION

This invention relates to a lightweight, self-contained means for indicating the position or movement of a fishing pole under conditions of low visibility such as when fishing at night or the like.

Several devices are known in the prior art wherein light emitting means is associated with a fishing pole for indicating a position or movement of the fishing pole or for casting sufficient light to enable a person using the fishing pole to see under conditions of low visibility such as at night or the like. Such prior art units are relatively bulky or cumbersome to use and are relatively expensive. Further, some such prior art units are not mounted at the tip of the pole and therefore do not accurately indicate the position or movement of the tip of the pole as would occur, for example, when a fish strikes the hook on a line guided on the pole. Further, the prior art devices frequently interfere with the operation of the fishing pole because of their excessive weight and size, and in many instances, the light emitting means is separate from a means for supplying energy to the light. In some prior art devices, specially constructed fishing poles are used with the means for supplying energy to the light emitting means being contained in the handle of the fishing pole and the light emitting means being associated with a portion of the flexible part of the fishing pole.

In many areas, the best fishing is found to occur at night, particularly in surf fishing and the like, and without any means on the fishing pole itself for indicating when a fish has struck the hook on the fishing line guided by the fishing pole, it is extremely difficult for the fisherman to know when he has a strike or a nibble. Moreover, if the fishing pole is dropped in shallow water or on the ground at the edge of a body of water, it is often extremely difficult to locate the fishing pole at night. Accordingly, many fisherman who engage in night fishing currently rely on the use of flashlights or lanterns or the like to cast sufficient light to enable them to see the position or movement of the fishing pole, but the use of such sources of light can be detrimental to the advantages of night fishing.

The present invention solves these problems of the prior art by providing a lightweight self-contained nibble detecting light which is economical and which can be readily attached to the tips of existing fishing poles for quickly and accurately indicating the position or movement of the fishing pole under conditions of low visibility and yet at the same time, does not in any way interfere with the functioning of the fishing pole.

In the present invention, the light emitting means and the source of energy therefor are contained in a housing having means for attaching the housing to the tip of a fishing pole. The housing also includes means for guiding the fishing line on the fishing pole and does not interfere in any way with the structure or the functioning of the fishing pole. The light emitted by the light emitting means is readily visible from any angle up to at least 90° relative to the axis of the fishing pole, and on-off switch means is associated with the housing for disconnecting the source of energy from the light emitting means when the unit is not in use in order to conserve energy. The means for supplying energy to the light emitting means is readily replaceable as is the light emitting means itself. With the present invention attached to a fishing pole, a person using the fishing pole can readily observe the position or any movement of the tip of the fishing pole under conditions of poor visibility such as when fishing at night or the like.

OBJECTS OF THE INVENTION

It is an object of this invention to provide an economical, lightweight self-contained lighting unit attachable to the tip of a fishing pole to indicate a position or movement of the fishing pole under conditions of low visibility so that a person using the fishing pole is enabled to readily observe a nibble or strike by a fish or any other pull on the fishing line which affects the tip of the pole.

Another object of this invention is to provide a means on a fishing pole to enable a person to locate the position of the fishing pole when it is dropped or the like under conditions of low visibility.

A further object of this invention is to provide a lightweight self-contained nibble detecting light for a fishing pole wherein the lighting unit includes a fish line guide therein for guiding a fishing line on said fishing pole.

An even further object of this invention is to provide a small and lightweight lighting unit that can be attached to the tip of a fishing pole without interfering in any way with the action of the fishing pole.

Yet another object of this invention is to provide a lighting unit for a fishing pole which includes an on-off switch to disconnect a light emitting means from a source of energy when the unit is not in use so as to conserve energy.

A still further object of this invention is to provide a lightweight self-contained nibble detecting light for attachment to a tip of a fishing pole, wherein the nibble detecting light is waterproof.

A still further object of the invention is to provide a nibble detecting light for fishing poles which enables a person using the pole to readily detect the position of the fishing pole to prevent the fishing pole and reel from being pulled into the water and lost by large fish or when the line gets caught while boating.

A still further object of the invention is to provide a lightweight self-contained nibble detecting light for fishing poles which includes a small voltage, small amperage light bulb and a battery for supplying energy to the light bulb, said battery being readily replaceable.

An even further object of the invention is to provide a relatively snag-free tip on a fishing pole which has means for emitting light to indicate a position or movement of the fishing pole.

BRIEF DESCRIPTION OF THE DRAWINGS

FIG. 1 is a perspective view, shown in approximately actual size, of a portion of a fishing pole having the nibble detecting light means of the present invention attached to the tip end thereof with the fishing line guided in a portion of the nibble detecting light means.

FIG. 2 is a front view in elevation of the nibble detecting light means of FIG. 1.

FIG. 3 is an enlarged sectional view taken along line 3—3 in FIG. 1 of the nibble detecting light shown in its off position.

FIG. 4 is an enlarged sectional view similar to FIG. 3 with the nibble detecting light shown in its on position.

FIG. 5 is an enlarged exploded view of the nibble detecting light means of FIG. 1 and is shown partly in section.

FIG. 6 is a slightly enlarged view in section similar to FIG. 3 of a modified lighting means.

DETAILED DESCRIPTION OF THE INVENTION

Referring now to the drawings, wherein like reference numerals indicate like parts throughout the several views, a conventional fishing pole is indicated at P and has a fishing line guide grommet or eyelet E affixed thereto in a conventional and well-known manner. A fishing line L is received through and guided by the eyelet E. A lightweight, self-contained nibble detecting light means 1 is attached to the tip end of the fishing pole P and has a suitable fishing line guide grommet or eye 2 therein through which the fishing line L is also received and guided.

The nibble detecting light means 1 comprises a housing 3 integrally molded or otherwise formed of any suitable transparent or translucent material such as polyethylene plastic or the like so that light is enabled to pass therethrough. The housing could also be formed of opaque materials such as metal or the like and have openings therein for passing light, if desired. The housing 3 includes a rearwardly tapered projection 4 on one end thereof having an axial bore 5 in the end thereof for receiving the tip end of the fishing pole P therein. The tip end of the fishing pole P may be suitably fixed in the bore 5 as with a suitable adhesive or the like. The other end 6 of the housing is externally threaded as at 7 for mating threaded engagement with a complementary set of internal threads 8 in a cup-shaped cap member 9 which is adjustably threadably engaged over the end 6 of the housing and has a watertight fit therewith.

A cylindrical chamber 10 is formed in the body 3 and extends through the end 6 thereof at one end and terminates at its other end at a shoulder 11 within the base portion of tapered end 4. A paraboloidal shaped cavity 12 extends from the inner end of cavity 10 rearwardly into the tapered portion 4 of the body 3. A bulb retainer 13 having an enlarged diameter, cylindrical collar 14 on one end thereof is fitted within chamber 10 in abutting engagement with shoulder 11 at the inner end thereof. A suitable bulb 15 such as a 1-½ volt, 15 milliampere bulb is held in one end of the bulb retainer 13 with the positive lead 16 thereof connected as by soldering or the like with a washer 17 formed of a suitable, electrically conductive material such as brass or the like. The washer 17 is suitably secured to the retainer 13 in surrounding relationship thereto and in abutting engagement with the enlarged diameter portion 14. The negative lead 18 of the bulb 15 is connected as by soldering or the like with a suitable, electrically conductive contact 19, such as a brass washer or the like fixed to the opposite end of bulb retainer 13. A frusto-conically shaped coil compression spring 20 formed of electrically conductive material is engaged at its small end with the washer 17 and at its opposite end with the positive side of a small hearing aid type battery 21 and thus serves both to establish electrical contact between the positive lead of the bulb and the positive side of the battery, and to urge the battery away from bulb retainer 13. The contact 19 establishes contact between the negative lead 18 of the bulb 15 and the negative side of the battery 21 when the battery is in abutting engagement with contact 19.

A relatively small, centrally located axial projection 22 on the inside of cap 9 normally engages the battery 21 to hold it against the washer 19 when the cap is threaded onto the end 6 of body 3 to energize bulb 15 and cause light to be emitted therefrom and through the tapered portion 4 of body 3.

A radially enlarged, generally ovate or egg shaped flange 23 is formed on the body 3 intermediate the ends thereof and includes an elongated upstanding portion 24 in which the grommet or eye 2 is mounted.

In FIG. 3, the cap 9 is shown as threaded partially off of the end 6 of body 3, and the spring 20 in this position of the cap urges the battery 21 outwardly away from the contact 19 and holds the battery in engagement with the projection 22 on the inside of cap 9.

In FIG. 4, the cap 9 is threaded all the way onto the end 6 of body 3 and the projection 22 engages battery 21 and holds it against contact 19 against the bias of spring 20 to energize the light bulb 15.

The cap may be completely removed from the end 6 of body 3, if desired, to replace the battery 21 or bulb 15. Alternately, rather than the threaded means 7 and 8 cooperating between the end 6 of body 3 and the cap 9, the cap 9 may have a frictional fit with the end 6 of body 3, or other suitable means such as a bayonet connection or the like may be used.

Further, the bulb 15 may be removably supported in the bulb retainer 13, if desired, such as by a push type or twist mounting.

Referring now to FIG. 6, a modification of the invention is illustrated wherein the enlarged flange 23' is formed separately from the body 3' and is held on the end 6 of the body 3' by the cap 9. The flange 23' is generally ovate or egg shaped as in the previous embodiment, but has a hole 25 therethrough in which the end 6 of body 3' is received, with the flange 23' in abutting engagement with a shoulder 26 at the base of tapered portion 4 of the body 3'.

By way of specific example, a lighting unit in accordance with the present invention is approximately 1-⅜ inches by 1-⅜ inches in overall dimensions and utilizes a 1.5 volt, 15 milliampere light bulb, No. CM 7201, and an E 675E hearing aid battery.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A lightweight, compact, self-contained lighting unit attachable to the tip end of a fishing pole to indicate a position or movement of the pole to a person using the pole under conditions of low visibility, a one-piece, hollow, light-transmitting housing with means on one end thereof for attachment of the housing to the end of the fishing pole, a fishing line guide means on said housing, said housing being open at its other end, a light bulb in said hollow interior facing toward said one end of said housing and toward the butt end and handle of the pole when said housing is attached to the pole, a battery in said hollow interior operatively connected with said light bulb for energizing said light bulb, and movable means closing said other end of said housing to maintain said battery and light bulb in operative position in said housing and when moved in one direction away from the battery effecting deenergization of said light bulb and when moved in the other direction toward said battery effect-ing energization of said light bulb.

2. An economical, lightweight self-contained lighting unit as in claim 1, wherein at least a portion of said housing is formed of a material capable of pass-ing light therethrough.

3. An economical, lightweight self-contained lighting unit as in claim 1, wherein said battery is a hearing aid type battery or the like.

4. An economical, lightweight self-contained lighting unit as in claim 3, wherein said movable means comprises a cap means mounted on said other end of said housing.

5. An economical, lightweight self-contained lighting unit as in claim 4, wherein a spring means is interposed between said battery and said light bulb, said spring means normally urging said battery away from said light bulb into engagement with said cap means.

6. An economical, lightweight self-contained lighting unit as in claim 5, wherein said spring means establishes electrical contact between the positive lead of said light bulb and the positive side of said battery.

7. An economical, lightweight self-contained lighting unit as in claim 1, wherein said means for guiding a fishing line on said fishing pole comprises an eyelet fixed in a radially enlarged flange on said housing.

8. An economical, lightweight self-contained lighting unit as in claim 7, wherein said flange and said housing are integrally formed.

9. An economical, lightweight self-contained lighting unit as in claim 4, wherein said cap means is threadably engaged on said other end of said housing for adjustable movement relative thereto.

10. An economical, lightweight self-contained lighting unit as in claim 9, wherein said cap means has a water tight fit with said other end of said housing.

11. An economical, lightweight self-contained lighting unit as in claim 10, wherein said one end of said housing is tapered, at least said one end being formed of a material capable of passing light therethrough.

12. An economical, lightweight self-contained lighting unit as in claim 11, wherein the means for attaching the housing to the tip of a fishing pole comprises an axial bore in said one end of said housing for receiving the tip end of said fishing pole therein.

13. An economical, lightweight self-contained lighting unit as in claim 12, wherein said housing is formed of a synthetic plastic material.

14. An economical, lightweight self-contained lighting unit as in claim 13, wherein said housing is transparent.

15. An economical, lightweight self-contained lighting unit as in claim 13, wherein said housing is translucent.

16. An economical, lightweight self-contained lighting unit as in claim 11, wherein said radially enlarged flange is formed separately from said housing and has an opening therethrough, said one end of said housing being received through said opening in said flange, said flange being held on said housing between a shoulder at the base of said tapered portion and said cap means.

* * * * *